UNITED STATES PATENT OFFICE.

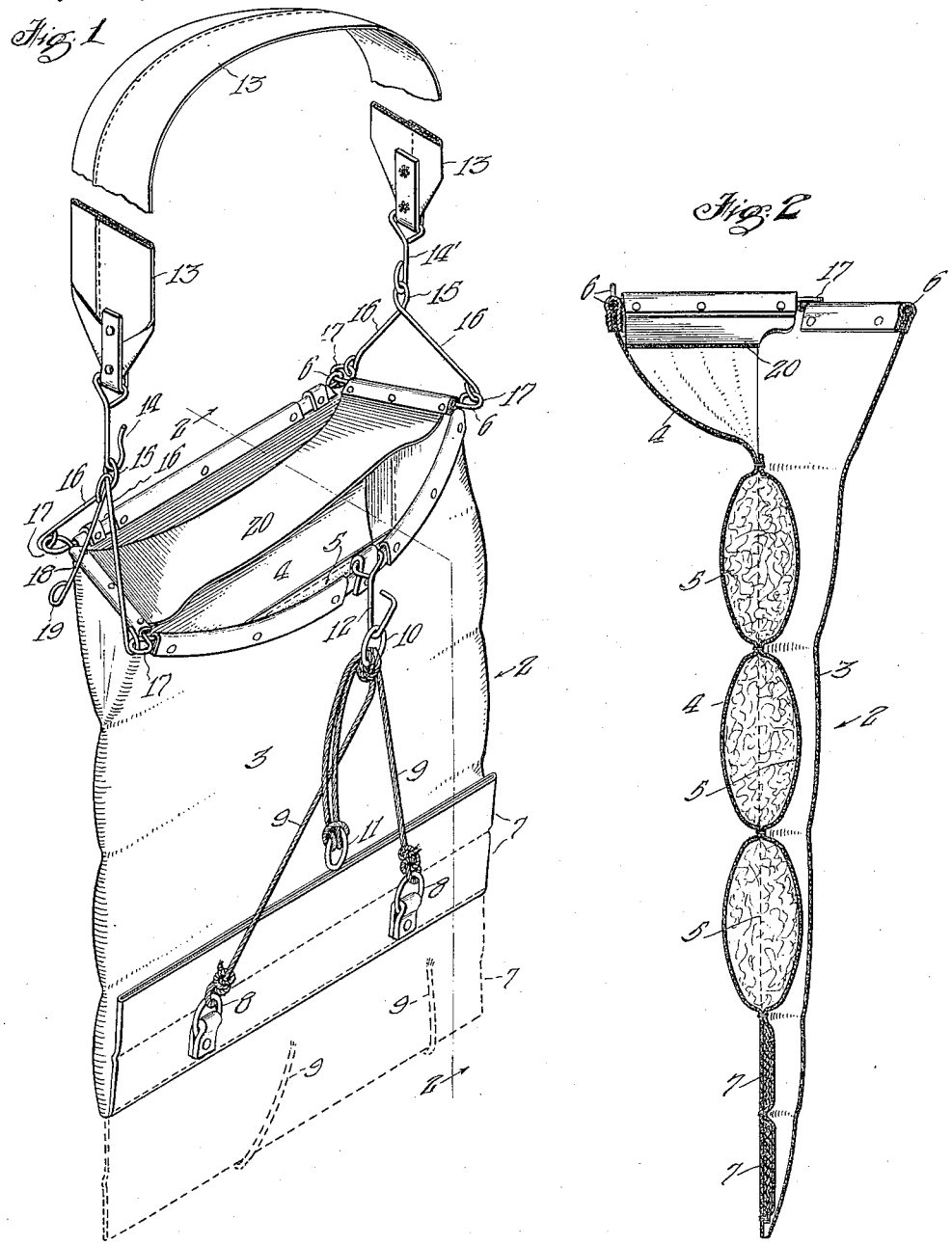

CORNELIUS J. O'RIELY, OF LOS ANGELES, CALIFORNIA.

FRUIT-PICKER'S RECEPTACLE.

1,064,761.

Specification of Letters Patent.

Patented June 17, 1913.

Application filed June 17, 1912. Serial No. 704,235.

*To all whom it may concern:*

Be it known that I, CORNELIUS J. O'RIELY, a citizen of the United States of America, residing at Los Angeles, in the county of Los Angeles, State of California, have invented a certain new and useful Fruit-Picker's Receptacle; and I do hereby declare the following to be a full, clear, and exact description of the invention, such as will enable others skilled in the art to which it appertains to make and use the same.

This invention relates to fruit-picker's receptacle, and it may be said to consist in the provision of the novel features therein and in the novel and improved construction, arrangement and combination of the parts thereof as will be apparent from the description and claims which follow hereinafter.

One object of the invention is to provide an improved article of the class specified which in use reduces to a minimum any bruising and damage to the fruit.

Another object of the invention is to provide means in the upper end portion of the receptacle for breaking the fall of fruit dropped therein.

Further objects of the invention are to provide an article of the class specified which is simple in construction, strong and durable, easily and quickly adjusted, easy and convenient to use, and effective to prevent damage to the fruit.

Other objects and the advantages of the invention will be apparent to those skilled in the art from a consideration of the following description of the preferred form of construction embodying the invention, taken in connection with the accompanying drawings in which—

Figure 1 is a partly broken perspective view of a receptacle having the invention applied thereto, and Fig. 2 is a sectional view taken on the line 2—2 of Fig. 1, with parts omitted and the lower end portion of the receptacle dropped down.

The receptacle 2 is formed of flexible material, preferably canvas, and is open at the top and has a narrow opening at the bottom. As shown, the sides 3 and 4 are preferably arranged sufficiently close together to have the fruit contact with the same to sufficiently retard the movement of the fruit as it falls toward the bottom of the receptacle to prevent damage to the fruit. The side 4 is provided with suitable padding 5 to prevent bruising of the fruit by striking against hard objects on the person of the user of the receptacle. The padding 5 provides a succession of curved surfaces for the fruit to roll against and spreads the side 4. The upper part of the receptacle 2 is preferably formed flaring and has suitably affixed thereto a rod 6 which is formed and arranged to hold the sides 3 and 4 spread apart. At the lower end of the side 4 on the interior of the receptacle are arranged one or more layers of suitable flexible stiffening material 7, and on the exterior may be suitably affixed the rings 8 to which may be secured the ends of a rope or cord 9 which may have arranged spaced apart thereon rings 10 and 11 which are adapted to be fitted over the hook 12 suitably affixed on the upper end of the side 3. When the ring 10 is fitted over the hook 12, the lower end portion of the receptacle 2 is turned upwardly and the bottom of the receptacle 2 thereby closed, and when the ring 11 is fitted over the hook 12 the lower end of the receptacle 2 drops down so that fruit in the bag may be delivered therefrom to a suitable container, as will be understood. The flexible stiffening material 7 prevents undue bulging out of the sides 3 and 4 at the narrow opening at the bottom of the receptacle so that the fruit is discharged comparatively slowly and evenly through the narrow opening and bruising of the fruit is avoided. A shoulder band 13 may be connected to the receptacle 2 by means of hooks 14 and 14' suitably affixed at its ends and adapted to fit in eyes 15 in the middle portion of angular rods 16 which latter may have the ends thereof fitted through oppositely disposed eyes 17 formed in the rod 6. A rod 18 may be connected to one of the eyes 15 and have an eye 19 through which the hook 14 may be placed to lengthen the connection between the band 13 and the receptacle 2 when found expedient.

In the upper end portion of the receptacle 2 is suitably arranged a flexible strip 20 which is adapted to intercept the fruit as it is dropped into the mouth of the receptacle 2 and break its fall downwardly in the receptacle. As shown, the strip 20 is of less width than the mouth of the receptacle 2 and may have the ends thereof suitably secured to the rod 6.

While one form of construction in which the invention may be embodied has been particularly illustrated and described, there are many changes and modifications thereof that will readily occur to those skilled in the art, wherefore, the right is reserved to all such changes and modifications as do not depart from the spirit and scope of the invention as defined in the appended claims.

I claim:—

1. A fruit-picker's receptacle of flexible material and formed open at the top and bottom and with a rod on its upper end portion to spread its sides, and provided with padding and having stiffening strips at its lower end portion, a cord attached to the lower end portion, rings on the cord, a hook on which said rings may be fitted, and a strip of less width than the mouth of the receptacle arranged in the upper end portion of the receptacle and attached to the rod, substantially as set forth.

2. A fruit-picker's receptacle of flexible material and formed open at the top and bottom and with a rod on its upper end portion to spread its sides and having its sides arranged sufficiently close together to retard the movement of fruit as it falls toward the bottom of the receptacle and provided with padding to prevent damage to the fruit, and having stiffening strips arranged at its lower end portion, a cord attached to the lower end portion, rings on the cord, a hook on which said rings may be fitted, and a flexible strip of less width than the mouth of the receptacle arranged in the upper end portion of the receptacle and attached to the rod, substantially as set forth.

3. A fruit-picker's receptacle formed of flexible material open at the top and with a rod on its upper end portion to spread its sides, and having a flexible strip of less width than the mouth of the receptacle arranged in the upper part of the receptacle and attached to said rod, substantially as described.

In testimony whereof, I have signed my name to this specification in the presence of two subscribing witnesses at Los Angeles, county of Los Angeles, State of California, this 8th day of June A. D. 1912.

CORNELIUS J. O'RIELY.

Witnesses:
FRED A. MANSFIELD,
ALEX. H. LIDDERS.

---

Copies of this patent may be obtained for five cents each, by addressing the "Commissioner of Patents, Washington, D. C."